3,832,358
DESHYDROXYMETHYL DERIVATIVES OF
MONENSIN
James W. Chamberlin, Indianapolis, Ind., assignor to Eli
Lilly and Company, Indianapolis, Ind.
No Drawing. Filed Jan. 15, 1973, Ser. No. 323,600
Int. Cl. C07d 7/46
U.S. Cl. 260—345.7      2 Claims

ABSTRACT OF THE DISCLOSURE

Deshydroxymethyl derivatives of monensin and nigericin are disclosed. The new compounds are useful as coccidiocides.

BACKGROUND OF THE INVENTION

Coccidiosis has been known for many years to be one of the major afflictions of domestic animals, particularly of fowl. The disease is caused by parasitic coccidia, of which those of the genus Eimeria are most numerous. Coccidiosis is usually transmitted by ingestion of oocysts of the coccidia, which may be likened to the spores of fungi. The ingested oocysts quickly develop into forms which are capable of penetrating into the tissues of the host animal.

Coccidia such as Eimeria tenella which live in the digestive tract of the host animal invade cells of the gut walls, where they cause inflammation, loss of blood, and diarrhea. Serious injury to the animal and economic loss result. Other coccidia infect the liver, brain, bloodstream, and other parts of the host.

Veterinary science has sought to develop anticoccidial drugs since the identification of coccidiosis as a distinct disease. Monensin and nigericin are among the drugs now known to be effective against coccidia. Both drugs are products of fermentation processes. The drugs are most useful as prophylactics for preventing coccidiosis, and are also effective treatments for infected animals.

Monensin was first described by Haney et al., U.S. Pat. 3,501,568. It has achieved wide use in the poultry industry. Monensin is produced by fermentation by an organism which is on unrestricted deposit under the number ATCC 15413 at the American Type Culture Collection, 12301 Parklawn Drive, Rockville, Md. 20852.

Nigericin has also been known at different times as helexin C, antibiotic 464, antibiotic K178, polyetherin A, and azalomycin M. It has been described by Gorman et al., U.S. Pat. 3,555,150, and by Steinrauf et al., Biochem. and Biophysical Research Communications 33, 29 (1968). The organism which produces nigericin, a strain of Streptomyces violaceoniger, is on unrestricted deposit as NRRL B1356 at the Northern Research and Development Div., Agricultural Research Service, United States Department of Agriculture.

Monensin and nigericin are closely related compounds. Both compounds are made up of a chain of oxygen-containing rings, terminated at one end with an acid group and at the other with a hydroxyl group. Both compounds form salts with monovalent metals in an unusual manner. The oxygen atoms in the rings form bonds to the metal atom, and the acid group and the hydroxyl group join to each other by hydrogen bonding. Thus, the organic molecule forms a ball around the metal atom. Such salts of both monensin and nigericin have unusual ability to transport ions across interfaces and membranes.

SUMMARY

I have discovered deshydroxymethyl derivatives of monensin and of nigericin, which are useful coccidiocides in both the acid and salt forms.

DESCRIPTION OF THE PREFERRED EMBODIMENT

My new deshydroxymethyl derivatives are prepared by the following general process. As is expected from the similarity of monensin and nigericin to each other, the deshydroxymethyl derivatives of both compounds are prepared by the same process. Either the acid or salt forms of monensin and nigericin may be used as the starting compound.

Room temperature treatment of monensin or nigericin with borohydride breaks the hydroxyl-end ring at the ring oxygen, which is reduced to another hydroxyl. Excess borohydride is decomposed, the reaction mixture is worked up, and the intermediate product, which need not be freed of unreacted starting material, is isolated as a solid residue.

The residue is treated with aqueous metaperiodate at room temperature to cleave off the hydroxymethyl group and close the terminal ring, forming the desired product in the acid form.

The structures of the deshydroxymethyl derivatives produced by the above general process are illustrated below. The structures also show the close structural relationship of monensin and nigericin. The structure below is that of the acid form of deshydroxymethylmonensin.

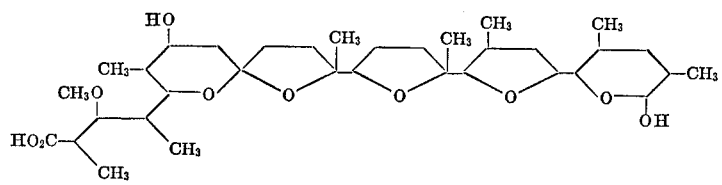

The structure of the acid form of deshydroxymethylnigericin is shown below.

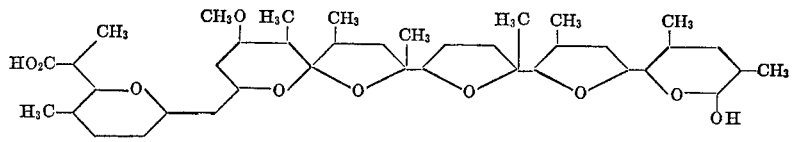

Monensin and nigericin for use as starting compounds are obtained by prior art processes.

The microbiological production method of monensin has been adequately set out in U.S. Pat. 3,501,568, and need not be repeated here. The fermentation process produces four monensin factors. Factor A is by far the most abundant and important factor, and is the factor the derivative of which is shown above. The deshydroxymethyl derivatives of all of the factors are made by the same process.

Nigericin is produced by fermentation in any of several types of fermentation media. It is not produced efficiently in synthetic media, but requires a complex nitrogen source such as fishmeal, distiller's residues, cottonseed meal, or soybean flour. The medium must also include a carbon source such as a starch, a sugar, or the like.

Nigericin is best produced by first inoculating an aerated starter tank with a vegetative inoculum. The contents of the starter tank is used, when the fermentation is proceeding actively, to inoculate a production tank. The production tank is maintained at about 28° C., and is supplied with sterile air at a rate from about half to about twice the tank's volume per minute.

The nigericin is harvested after about 4 to 6 days of growth. Most of the activity is in the cells, which are filtered out of the broth. Extraction with an alcohol, concentration, transfer of the activity first to aqueous alcohol and then to benzene and chromatography isolate the nigericin.

Those skilled in the art will recognize that the antibiotic production processes discussed below must be conducted under sterile conditions in order to obviate contamination.

The example below shows in more detail the method of producing nigericin.

Example 1

A vegetative inoculum is prepared by growing the *Streptomyces* organism known as NRRL B1356 on agar slants made up of 10 g. of dextrin, 2 g. of an enzyme-digested casein, 1 g. of beef extract, 1 g. of yeast extract, and sufficient water to make 1 liter. The slants are grown for 3 days at 28° C.

The spores are harvested from the slants and transferred to a 30-liter starter tank containing the following sterile medium.

|  | Percent |
|---|---|
| soybean flour | 3 |
| brown sugar | 2 |
| cornsteep liquor | 0.5 |
| $K_2HPO_4$ | 0.1 |
| tap water | |

The starter tank is grown for 3 days at 28° C. One cubic foot per minute of sterile air is bubbled through the medium.

The contents of the starter tank are transferred aseptically to a 550-liter production tank containing the above medium. The fermentation is allowed to continue for 5 days at 28° C., while 20 c.f.m. of sterile air is bubbled through the medium.

The broth is filtered with diatomaceous filter aid. The wet filter cake is extracted with 250 l. of methanol and the extract is concentrated to 45 l. The concentrated extract is extracted with an equal volume of butyl acetate, which is then washed with 0.2M $K_2HPO_4$, washed with water, and concentrated to a paste. The paste is extracted with 4.5 l. of petroleum ether, which is then evaporated to 1 kg. of oil.

The oil is partitioned in 2 l. of two parts of 90% aqueous methanol and three parts of petroleum ether, and then the petroleum ether is extracted twice with more 90% aqueous methanol. All the aqueous methanol portions are combined and concentrated to an oil, which is dissolved in benzene and adsorbed on an 1800 g. activated alumina column. Elution with, in succession, benzene, benzene+10% ether, ether, and ether+10% ethanol recovers the nigericin activity as the mixed sodium-potassium salt, m.p. 225–35° C. Conversion to the free acid, m.p. 170–72° C., is accomplished by partitioning the salt between ether and dilute hydrochloric acid.

The preparative example below shows the synthesis first of the acid form of deshydroxymethylmonensin, and then of the sodium salt form thereof.

Example 2

A solution of 10.0 g. of monensin sodium salt and 3.5 g. of sodium borohydride in 250 ml. of absolute ethanol was allowed to stand overnight at room temperature. In the morning, the excess borohydride was decomposed by dropwise addition of acetic acid. The mixture was diluted with 2500 ml. of saturated NaCl solution, and was extracted three times with ether. The combined ether extracts were then washed twice with water and once with saturated NaCl solution. The ether layer was then dried over magnesium sulfate and evaporated to dryness.

The residue was dissolved in 70 ml. of *t*-butanol and mixed with a solution of 10.3 g. of sodium metaperiodate in 100 ml. of water. The mixture was allowed to stand overnight at room temperature and was evaporated to dryness under vacuum. The residue was taken up in ether and filtered. The filtrate was then evaporated to dryness under vacuum to produce 3.68 g. of amorphous product. That product was chromatographed on a 180 g. column of silica gel, first with 1:4 ethyl acetate:benzene and then with 1:3 ethyl acetate:benzene. The eluted fractions which were found to contain deshydroxymethylmonensin were combined, the solvent was evaporated under vacuum, and the product was recrystallized from acetone-water. The product was 1.19 g. of deshydroxymethylmonensin, the melting point of which was 78–80° C. Its elemental analysis was 65.31 percent C, 9.64 percent H. Its IR spectrum showed an absorption band at $5.91\mu$.

The sodium salt of deshydroxymethylmonensin, m.p. 155–158° C., was prepared by adjusting the pH of a 500 mg. sample of the acid form in aqueous methanol to 11 with 10 percent NaOH solution, and extracting the reaction mixture with ether. An IR spectrum of the sodium salt exhibited a strong band at $6.42\mu$ and a weak band at $5.91\mu$. Its NMR spectrum showed a singlet at $\delta 3.37$ and a doublet at $\delta 5.26$.

Deshydroxymethylnigericin is made, as shown below, by a similar process.

Example 3

A 375 mg. sample of the sodium salt of nigericin was dissolved in 15 ml. of ethanol and 100 mg. of sodium borohydride was added. The reaction mixture was allowed to stand overnight. Dropwise addition of acetic acid decomposed excess borohydride. The mixture was then diluted with ten volumes of water and triple-extracted with ether. The ether extracts were combined, dried, and evaporated to dryness.

The dried residue was dissolved in 25 ml. of *t*-butanol, 20 ml. of 0.2M sodium metaperiodate solution was added, and the mixture was left at room temperature for 3 days. It was then evaporated to dryness under vacuum. Ether was added to the residue and the ether-insolubles were removed by filtration. Evaporation of the filtrate isolated 300 mg. of deshydroxymethylnigericin as a mixture of the acid and the sodium salt form. The NMR spectrum of the acid exhibited singlets at $\delta 3.35$ and $\delta 3.37$, and doublets at $\delta 4.43$ and $\delta 5.07$.

The pure sodium salt of deshydroxymethylnigericin was made by dissolving 100 mg. of the above mixture in 20 ml. of methanol and 10 ml. of water, and adjusting the pH to 11 with NaOH. Extraction with ether, evaporation to dryness, and recrystallization from hexane produced 40 mg. of the desired sodium salt. The NMR spectrum of the salt showed singlets at $\delta 3.51$ and $\delta 3.66$ and a poorly resolved broad peak at $\delta 5.11$. Its elemental analysis was 65.34% C, 9.14% H, 3.21% Na.

It is well known in the veterinary pharmaceutical art that conditions within the animal to be treated frequently change a compound to forms other than that in which it was administered. Therefore, the acid or salt form in which my derivatives may be administered does not affect the method of treatment and may be chosen for reasons of economics, convenience, and toxicity. My deshydroxymethyl derivatives are equally useful as the acid or in the various salt forms, as the test results below show.

Representatives of the inorganic bases forming physiologically-acceptable salts with my new compounds include the alkali metal hydroxides, such as lithium hydroxide, sodium hydroxide, and potassium hydroxide; the alkali metal carbonates and bicarbonates, such as lithium carbonate and sodium bicarbonate; the alkaline earth metal hydroxides and carbonates such as calcium hydroxide and magnesium carbonate; and like inorganic bases.

Illustrative of the organic bases forming physiologically-acceptable salts with the deshydroxymethyl derivatives are the primary and secondary $C_1$-$C_4$ lower alkyl and lower hydroxyalkylamines such as ethylamine, isopropylamine, diethylamine, methyl-$n$-butylamine, ethanolamine, and diethanolamine.

The ammonium salts of my compounds are prepared with ammonia or ammonium hydroxide.

The salts of the deshydroxymethyl derivatives are prepared according to procedures commonly employed for the preparation of cationic salts. For example, the acid form of the compound is dissolved in a suitable solvent, and an aqueous or organic solvent solution of the desired base is added to the solution of the derivative. The salts are isolated by filtration and recrystallization or by evaporation of the solvent and purification by recrystallization. Examples 2 and 3 above illustrate the salt formation process.

I have found that my new derivatives of monensin and of nigericin are effective coccidiocides. My new compounds have been tested against the parasite *Eimeria tenella* growing in chicken kidney cell culture. Compounds to be tested were added to cell cultures at various concentrations, and the minimum concentration at which the developemnt of the parasite was inhibited was observed.

Minced chick kidney cell tissue was used to start cell cultures in lactalbumin hydrolysate culture medium. The cultures were incubated for 2-3 days at 40° C., until cultures were established and the cell sheet approached confluence.

When the cell cultures were established, about 200,000 *E. tenella* sporozoites/ml. of culture medium were added to each culture. The sporozoites were obtained by excystation of oocysts which were collected from a colony of infected chickens.

At the same time, a test compound dissolved or suspended in Hank's balanced saline was added to each cell culture. Serial dilutions of the test compounds were made, and an appropriate amount of the solution or suspension was added to each treated cell culture to achieve the desired concentration in the cell culture medium. Untreated control cultures containing sporozoites but without a test compound were also prepared.

The cultures were incubated at 40° for 96 hours. Each culture was then stained and examined microscopically. The parasites in untreated control cultures had developed to the second generation chizont stage. Both deshydroxymethylmonensin acid and deshydroxymethylnigericin sodium salt inhibited the development of *E. tenella* at the very low concentration of 0.01 mcg./ml. The coccidia in cultures treated with both compounds did not develop out of the sporozoite stage, and exhibited degeneration indicative of approaching death.

My compounds are used for the control of coccidiosis by administering them to the animals which are to be protected from coccidiosis. The dose of my compounds which should be used varies, depending on the species and the age of the animals to which they are administered. In general, doses from about 0.25 mg. of compound per kilogram of body weight per day to about 50 mg./kg./day are effective. The higher doses within that range, such as from about 5 mg./kg./day to about 50 mg./kg./day, are most useful for small animals such as fowl. The lower doses, such as from about 0.25 mg./kg./day to about 10 mg./kg./day, are most useful for large animals such as cattle. The optimum dose for a given animal tends to decrease as the animal grows.

The simplest and cheapest way to administer my new compounds to animals for the control of coccidiosis is to mix them in the feed or water offered to the animals. Feed or water mixtures are used except in unusual circumstances, such as when an animal is so ill that it is not eating or drinking. Feed formulations of my compounds are usually made by first making a feed premix containing the compound in a concentrated form, in the range of from about five percent to about 80 percent active. The premix is then mixed into feed to produce a final concentration in the range from about 10 g. of compound per ton of feed to about 1000 g. per ton.

Drinking water formulations of my compounds comprise the compounds in a soluble or suspendable form to be mixed with the animals' drinking water. The preparation of such formulations is well within the skill of the veterinary pharmaceutical art, and is accomplished in general by combining the compounds, usually in finely ground form, with surface-active agents.

My new compounds can also be administered to animals in other dosage forms, such as tablets, drenches, capsules, and boluses. My deshydroxymethyl derivatives are formulated in such forms according to the methods well known in the pharmaceutical art.

I claim:

1. Deshydroxymethylmonensin having the structural formula

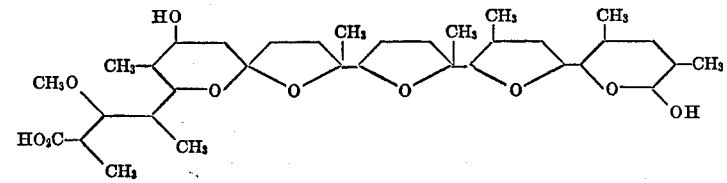

and the physiologically-acceptable salts thereof.

2. The compound of Claim 2 which is the sodium salt of deshydroxymethylmonensin.

References Cited

UNITED STATES PATENTS 3,501,568   3/1970   Haney et al. _____ 260—345.7

OTHER REFERENCES

Reid, M. W. et al., Poultry Science (1972) 51(1), pp. 139–46.

Fitzgerald, Paul R., J. Protozool (1972) 19(2), pp. 286–8.

NORMA S. MILESTONE, Primary Examiner

U.S. Cl. X.R.

424—283; 195—80